United States Patent
Hoffman

(10) Patent No.: US 6,612,729 B1
(45) Date of Patent: Sep. 2, 2003

(54) ILLUMINATION DEVICE

(75) Inventor: Joseph Andrew Hoffman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/526,610

(22) Filed: Mar. 16, 2000

(51) Int. Cl.⁷ .................................................. F21S 3/02
(52) U.S. Cl. ..................... 362/551; 362/20; 362/556; 362/582; 362/32; 385/133
(58) Field of Search ................................. 362/551, 582, 362/335, 336, 337, 340, 556, 26, 32; 385/36, 901, 146, 133

(56) References Cited

U.S. PATENT DOCUMENTS

| 1,128,634 | A | 2/1915 | Talbot |
|---|---|---|---|
| 2,994,149 | A | 8/1961 | Endelson |
| 3,241,256 | A | 3/1966 | Viret et al. |
| 3,486,261 | A | 12/1969 | Hardesty |
| 3,510,976 | A | 5/1970 | Pauline et al. |
| 3,591,941 | A | 7/1971 | Jaffe, Jr. |
| 3,689,346 | A | 9/1972 | Rowland |
| 4,244,683 | A | 1/1981 | Rowland |
| 4,260,220 | A | 4/1981 | Whitehead |
| 4,385,343 | A | 5/1983 | Plumly |
| 4,386,476 | A | 6/1983 | Schulman |
| 4,422,719 | A | 12/1983 | Orcutt |
| 4,576,850 | A | 3/1986 | Martens |
| 4,615,579 | A | 10/1986 | Whitehead |
| 4,715,137 | A | 12/1987 | Scheve |
| 4,750,798 | A | 6/1988 | Whitehead |
| 4,787,708 | A | 11/1988 | Whitehead |
| 4,791,540 | A | 12/1988 | Dreyer, Jr. et al. |
| 4,791,745 | A | 12/1988 | Pohn |
| 4,799,137 | A | 1/1989 | Aho |
| 4,805,984 | A | 2/1989 | Cobb, Jr. |
| 4,834,495 | A | 5/1989 | Whitehead et al. |
| 4,850,665 | A | 7/1989 | Whitehead |

(List continued on next page.)

FOREIGN PATENT DOCUMENTS

| AU | A-9428/85 | 5/1986 |
|---|---|---|
| AU | B-20642/88 | 1/1991 |
| DE | 37 06 392 A1 | 9/1988 |
| DE | 195 07 901 A1 | 9/1996 |
| EP | 0 235 447 A2 | 9/1987 |
| EP | 0 290 267 A2 | 11/1988 |
| EP | 0 800 036 A1 | 10/1997 |
| JP | 2-157791 | 6/1990 |
| JP | 2-269382 | 11/1990 |
| JP | 7-64085 | 3/1995 |
| NZ | 206773 | 1/1987 |
| WO | WO 99/08139 | 2/1999 |

Primary Examiner—Sandra O'Shea
(74) Attorney, Agent, or Firm—David B. Patchett

(57) ABSTRACT

An illumination device including a light guide 22 surrounded by a protective sleeve 24. The light guide 22 is hollow and includes a cylindrical wall 26 having a structured outer surface 28 and a smooth inner surface 30. Release structures are provided to reflect or refract light through the cylindrical wall 26 of the light guide 22.

52 Claims, 11 Drawing Sheets

U.S. PATENT DOCUMENTS

| | | |
|---|---|---|
| 4,874,228 A | 10/1989 | Aho et al. |
| 4,883,341 A | 11/1989 | Whitehead |
| 4,906,070 A | 3/1990 | Cobb, Jr. |
| 4,965,950 A | 10/1990 | Yamada |
| 4,974,354 A | 12/1990 | Hembrook, Jr. |
| 4,975,809 A | 12/1990 | Ku |
| 5,043,716 A | 8/1991 | Latz et al. |
| 5,056,892 A | 10/1991 | Cobb, Jr. |
| 5,095,415 A | 3/1992 | Anderson et al. |
| 5,186,530 A | 2/1993 | Whitehead |
| 5,195,818 A | 3/1993 | Simmons et al. |
| 5,283,968 A | 2/1994 | Williams |
| 5,289,351 A | 2/1994 | Kashima et al. |
| 5,339,382 A | 8/1994 | Whitehead |
| 5,377,084 A | 12/1994 | Kojima et al. |
| 5,390,436 A | 2/1995 | Ashall |
| 5,471,348 A | 11/1995 | Miller et al. |
| 5,521,797 A | 5/1996 | Kashima et al. |
| 5,600,462 A | 2/1997 | Suzuki et al. |
| 5,625,968 A | 5/1997 | Ashall |
| 5,649,754 A | 7/1997 | Matsumoto |
| 5,661,839 A | 8/1997 | Whitehead |
| 5,692,822 A | 12/1997 | Dreyer |
| 5,745,632 A | 4/1998 | Dreyer |
| 5,784,517 A | 7/1998 | Johanson |
| 5,845,037 A * | 12/1998 | Miekis ........................ 385/136 |
| 5,857,761 A | 1/1999 | Abe et al. |
| 6,169,839 B1 * | 1/2001 | Johanson .................... 385/146 |
| 6,215,936 B1 | 4/2001 | Yoshikawa et al. |
| 6,239,851 B1 | 5/2001 | Hatazawa et al. |
| 6,259,854 B1 * | 7/2001 | Shinji et al. ................ 385/146 |

* cited by examiner

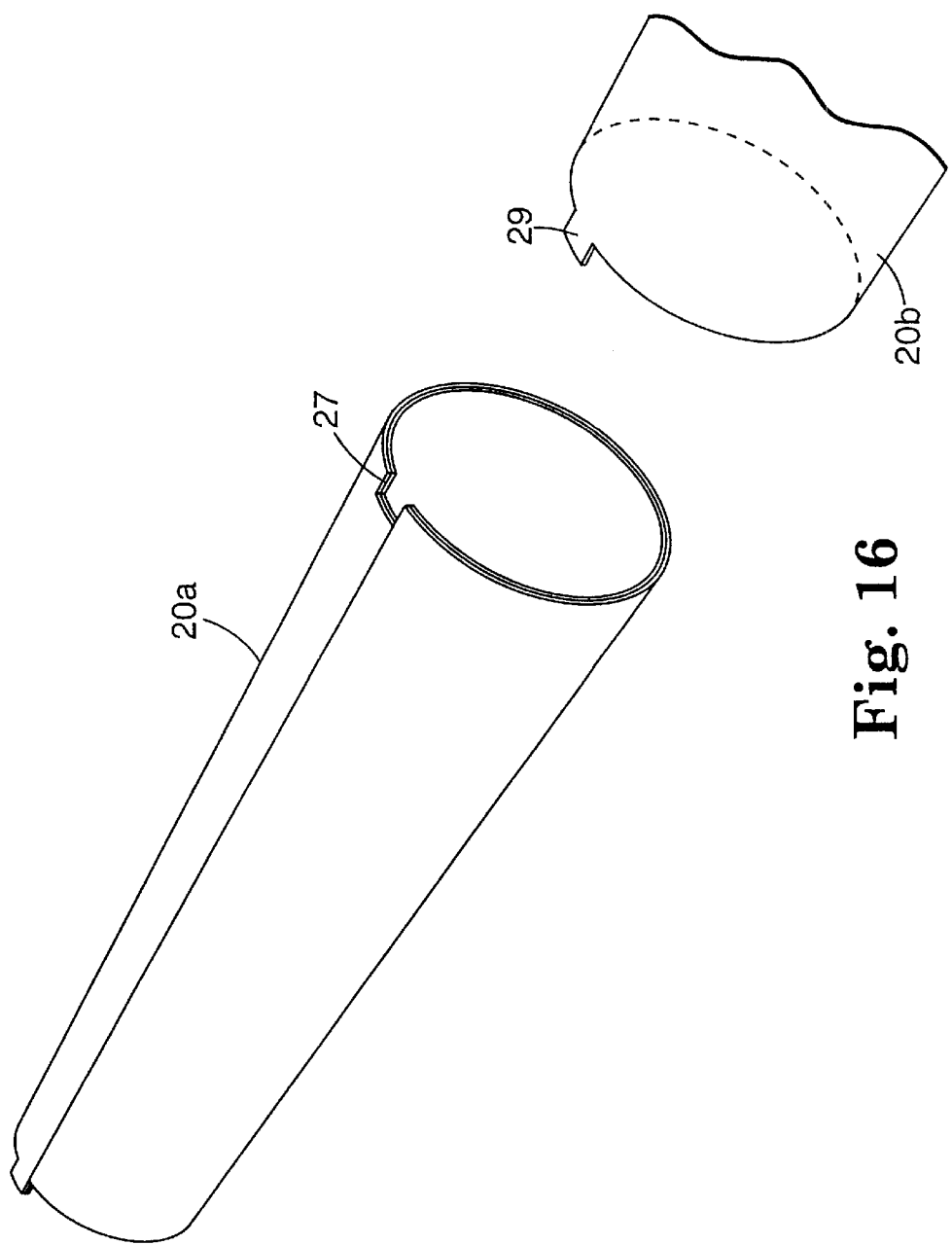

ILLUMINATION DEVICE

FIELD OF THE INVENTION

The present invention relates generally to a light guide for transmitting and/or distributing light. More particularly, the present invention relates to a light guide that transports light by total internal reflection.

BACKGROUND OF THE INVENTION

Light guides (i.e., light pipes, light conduits or light tubes) are commonly used to transmit light from a light source (e.g., a high intensity bulb) to a remote location with relatively low transmission losses. Light guides can also be used to effectively distribute decorative or functional light over relatively large areas.

A common light guide construction includes a tubular wall having an inner non-structured side, and an outer structured side. The non-structured side is generally smooth, while the structured side conventionally includes a linear array of prisms arranged side-by-side in parallel relationship to form a plurality of triangular grooves running the length of the light guide. Light entering the light guide within an acceptable angular range is contained by total internal reflection as it travels along the length of the light guide. An exemplary light guide, as described above, is disclosed in U.S. Pat. No. 4,805,984, which is hereby incorporated by reference.

Various techniques have been used to distribute light from a light guide for the purpose of illuminating an area. One technique involves altering the prisms (e.g., by rounding the prism corners, abrading the prisms, completely removing selected prisms, etc.) such that light is released through the altered regions. Another technique involves placing a light extractor within the light guide. Typically, the extractor is a strip or sheet of material (e.g., "SCOTCH-CAL EXTRACTOR FILM™") configured to reflect the light toward the light guide wall at an angle outside the angular range of total internal reflection. When the light is reflected in such a manner, the internal reflectance of the light guide is reduced, thereby allowing light to escape through the wall of the guide to provide decorative or functional lighting.

Light guides are commonly manufactured using optical lighting film (OLF). A typical OLF is made of a relatively thin sheet of transparent material (e.g., acrylic or polycarbonate) having a linear array of prisms embossed or otherwise formed at one side of the sheet. The sheet of material is typically sufficiently flexible to allow the OLF to be rolled to form a light guide in the form of a tube. OLF's suitable for use in manufacturing light guides are disclosed in U.S. Pat. Nos. 4,906,070 and 5,056,892, which are hereby incorporated by reference.

SUMMARY OF THE INVENTION

One aspect of the present invention relates to a light conveying device including a hollow light guide. The light guide includes a wall having a generally smooth inner side and a structured outer side. The structured outer side includes a plurality of prisms defining grooves that extend along a length of the light guide. A protective outer sleeve is provided around the structured outer side of the light guide. In certain embodiments, the sleeve is bonded to the light guide at least three locations spaced about a perimeter of the light guide. In other embodiments, a fixture is used to retain the light guide in an elastically deformed, non-cylindrical cross-sectional configuration.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 16 shows a pair of lighting modules constructed in accordance with the principles of the present invention.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
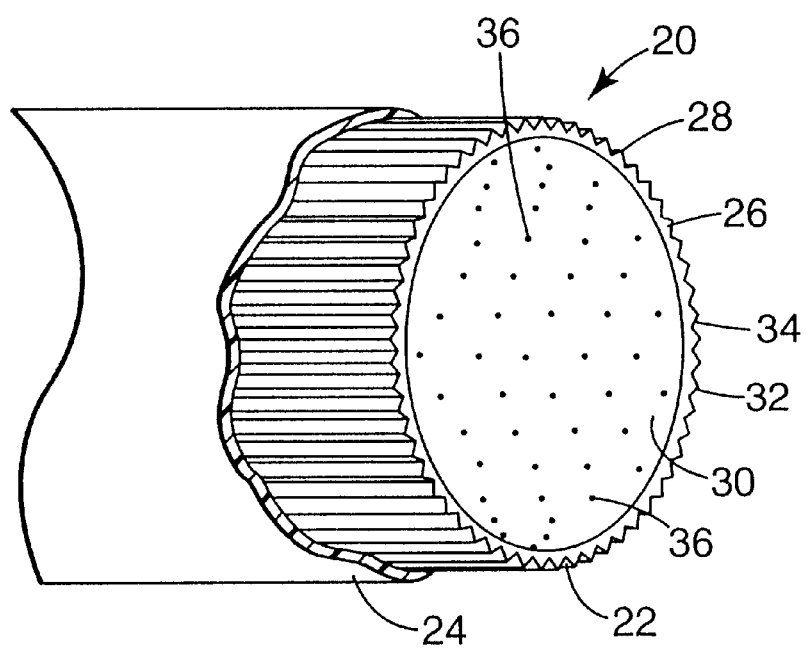
FIG. 1 is a partially cut-away view of an illumination device constructed in accordance with the principles of the present invention.
Figure 2:
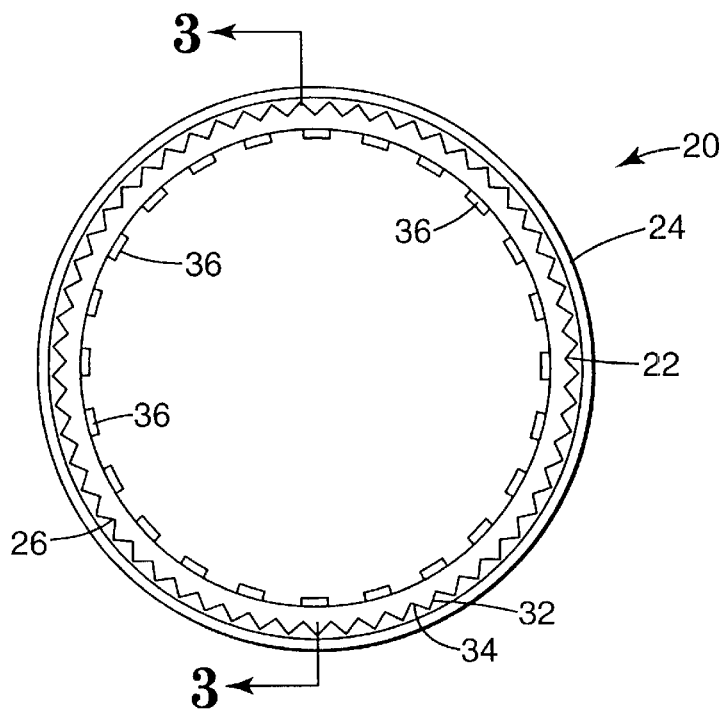
FIG. 2 is an end view of the illumination device of FIG. 1.
Figure 3:
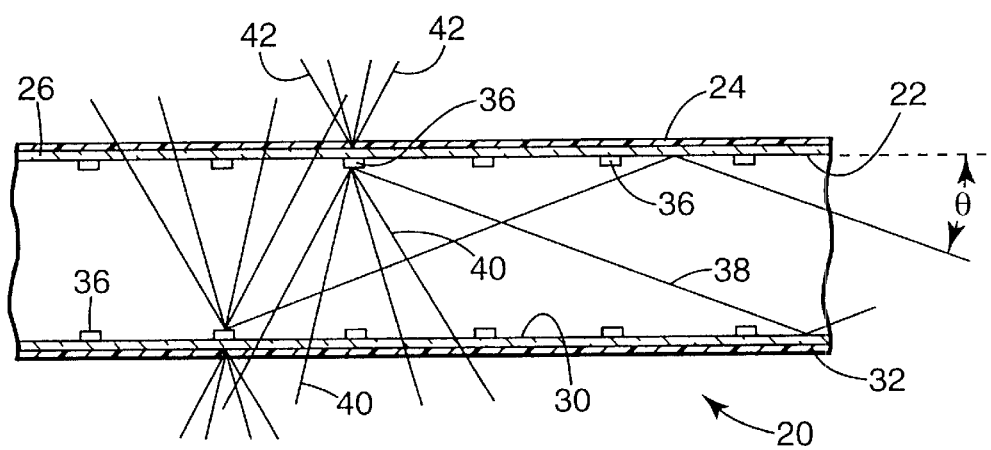
FIG. 3 is a cross-sectional view taken along section line 3—3 of FIG. 2.

FIGS. 1–3 illustrate an illumination device 20 constructed in accordance with the principles of the present invention. The illumination device 20 includes a hollow, tubular light guide 22 surrounded by a flexible, protective outer sleeve 24. The light guide 22 includes a cylindrical wall 26 having a structured outer surface 28 and a generally smooth inner surface 30. The structured outer surface 28 includes a linear array of prisms 32 (e.g., right angle isosceles prisms or other types of prisms) arranged side-by-side in parallel relationship to form a plurality of grooves 34 running the length of the light guide 22. The light guide 22 is configured such that incident light traveling through the light guide 22, within a predetermined angular range, will be totally internally reflected within the light guide 22. For example, as shown in FIG. 3, light that strikes the inner surface 30 of the light guide 22 at an angle less than θ will be totally internally reflected within the light guide 22. The angle θ is defined as the arc sine of the ratio of the index of refraction of the surrounding medium (typically air) to that of the wall material. If the refractive index of the dielectric material is 1.5, as is the case for acrylic plastic, then θ is about 27.5 degrees.

The particular material used for the wall 26 of the light guide 22 may vary, but for most applications it is preferred for the material to be generally flexible and transparent. Exemplary types of material include polymeric materials or glass. Useful polymeric materials include acrylics and polycarbonates having nominal indices of refraction of 1.49 and 1.58, respectively. Other useful polymers are polypropylenes, polyurethanes, polystyrenes, polyvinyl chlorides, and the like. The particular material selected is not significant to the invention hereof, so long as it provides the described function. One exemplary type of product suitable for use in making the cylindrical wall 26 is optical lighting film (OLF) available from the 3M Corporation, St. Paul, Minn.).

There are a number of different ways to mass-produce the cylindrical wall 26 of the light guide 22. For example, U.S. Pat. Nos. 3,689,346; 4,244,683; and 4,576,850, the disclosures of which are hereby incorporated by reference, all disclose techniques suitable for manufacturing the cylindrical wall 26. The particular manufacturing process is not essential to the present invention, and is a matter of choice based on economics and availability.

To manufacture the light guide 22 using OLF, the OLF is preferably rolled or curled into a tubular configuration with a longitudinal seam of the tube being secured by conventional techniques such as ultrasonic welding, adhesive, adhesive tape, or clips. In some embodiments, the longitudinal edges of the tube can be overlapped. In other embodiments, the cylindrical wall 26 can be held in the tubular configuration via contact with the protective sleeve 24.

While it is convenient for the light conduit 22 to be made from flexible OLF, other structures could also be used. For example, the light guide 22 can be extruded or molded to provide either a flexible or rigid unitary member.

The thickness of the cylindrical wall 26 of the light guide 22 is not particularly essential to the present invention. However, in one non-limiting embodiment, the cylindrical wall 26 has a nominal thickness of about 0.015 of an inch and includes about 70 prisms per inch. Such an embodiment exhibits sufficient flexibility to be capable of being curled into a cylindrical light guide having a minimum diameter of approximately three inches. In addition, such a film will be rigid and self-supporting enough to maintain its shape when curled into a cylindrical light guide having a diameter of at least 18 inches.

The illumination device 20 also preferably includes a plurality of light release structures for causing light to be transmitted or released through the cylindrical wall 26 of the light guide 22. As shown in FIGS. 1–3, the light release structures include a plurality of dots 36 provided along the smooth inner surface 30 of the cylindrical wall 26. The dots 36 can include any number of different types of relatively small, discrete, non-interconnected release structures capable of reflecting or refracting light to an angle greater than θ such that the light can be released through the cylindrical wall 26. As shown in FIG. 1, the dots 36 are generally circular. However, it will be appreciated that the dots can have any number of different shapes. Exemplary other types of shapes include diamonds, octagons, triangles, rectangles, crosses, ellipses, non-symmetrical shapes, etc.

Depending upon the amount of light desired to be extracted from the light guide 22, the dot concentration can be varied. By increasing the dot concentration, more light is extracted from the light guide 22. By decreasing the dot concentration, less light is extracted from the light guide.

The term dot "concentration" is intended to mean the area of dot coverage provided per unit area of the smooth inner surface 30. The dot concentration can be varied by numerous different techniques. For example, the dot concentration can be increased by maintaining a constant number of dots per unit area of the inner surface 30, and increasing the relative size of the dots. Alternatively, the dot concentration can be increased by maintaining a uniform dot size, and increasing the number of dots per unit area of the inner surface 30. Still further, both the size of the dots and the number of dots per unit area can be concurrently varied to achieve desired lighting appearances.

In one embodiment, the dots 36 are arranged along lines having a spacing of about 20 lines per inch, and the dots provide 5–50 percent coverage per each line. In other embodiments, 0–100 percent line coverage can be provided. By spreading the dots 36 about the inner surface 30, and by keeping the dots 36 relatively small, light can be generally uniformly extracted from the light guide 22 without creating any outwardly visible edges or discontinuities in the lighting. In other words, the dots 36 can be used to provide lighting without any discrete or abrupt variations in lighting (e.g., noticeable edges such as those caused by sheet or strip type extractors can be eliminated). The dots 36 can also be used to provide 360 degree extraction through the light guide 22 (i.e., light is released about the entire circumference of the light guide 22). The dots 36 can further be used in non-cylindrical light guides to provide 360 degree light extraction. For such an embodiment, light is extracted about an entire perimeter of the light guide without generating any appreciable gaps or discontinuities in the lighting. For example, if the light conduit is rectangular, light is extracted from all four sides of the light guide without generating any appreciable gaps or discontinuities in the lighting. In alternative embodiments, the dots can be selectively positioned to cover only a partial arc-segment of the hollow light guide. For example, to direct light out of a specific arcuate portion of the light guide, the dots can be printed on only half the hollow light guide (i.e., the dots can be printed on a 180 degree arc segment of the light guide). In still other embodiments, the dot pattern can be provided at only selected regions of the light guide to provide a desired lighting effect or pattern (e.g., a helical waveform, stripes, etc.)

It is preferred for the dots 36 to be applied, sprayed, deposited, printed, deposited as particles, powder coated, spray painted or otherwise provided directly on the smooth inner surface 30 of the light guide 22. For example, the dots 36 can be printed (e.g., laser printed, ink jet printed, digitally printed, silk screen printed, etc.) directly on the smooth inner surface 30 of the cylindrical wall 26. Thermal transfer printers and thermal ink jet printers could also be used. Preferably, the dots 36 are printed on the smooth inner surface 30 while the cylindrical wall 26 is laid flat. After printing, the cylindrical wall 26 can be rolled to form the tubular light guide 22.

The dots 36 are preferably made of a translucent material capable of both reflecting and refracting (i.e., transmitting) light. For example, as shown in FIG. 3, a light beam 38 striking one of the dots 36 is both diffusely reflected or scattered (as shown by beams 40) and refracted (as shown by beams 42). The beams 40 and 42 are directed at an angle greater than θ such that the beams escape through the cylindrical wall 26 of the light guide 22. The dots 36 can be made of any number of different types of reflective/refractive coatings, inks, dyes or paints. A diffusely reflective white material such as titanium dioxide is preferred. The dots 36 are preferably sufficiently thin to ensure a certain degree of translucency. For example, when titanium dioxide is used, the dots 36 preferably have a thickness in the range of 10–15 microns. The combination of reflected and refracted light that escapes from the light guide 22 assists in providing a more uniform appearance to the light guide 22.

Since light is released as the light travels though the light guide 22, the intensity of the light within the light guide 22 decreases along the length of the light guide 22. However, it is frequently desired to make the brightness of the light substantially constant along the length of the light guide 22. The brightness of the released light at a particular point along the length of the light guide 22 is a function of the intensity of the light in the light guide 22 at that point. By increasing the concentration of light release mechanisms along the length of the light guide 22 in concert with the decrease in light intensity, it is possible to maintain a constant brightness along the light guide length.

Figure 4:
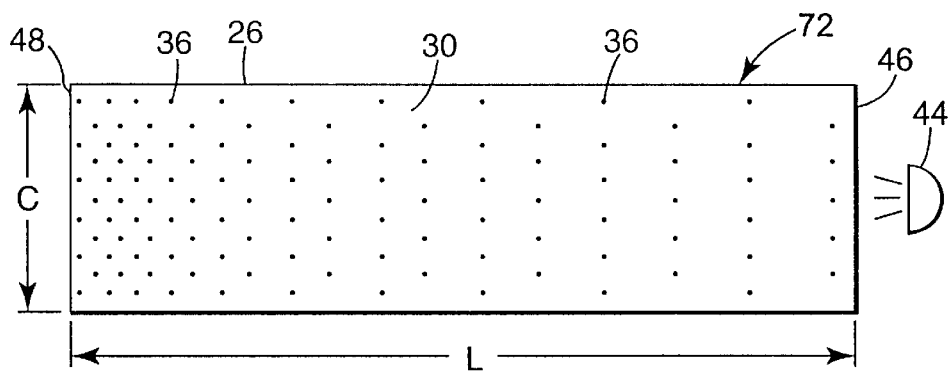
FIG. 4 is a plan view showing a light guide having a light extraction pattern in accordance with the principles of the present invention, the depicted light guide has been longitudinally cut and laid flat.

FIG. 4 shows one pattern of dots 36 that can be used with the light guide 22. As shown in FIG. 4, the cylindrical wall 26 of the light guide 22 has been longitudinally cut and laid flat with the smooth inner surface 30 facing upward. The light guide 22 includes a length L and a circumference C. The particular pattern of FIG. 4 is adapted to provide uniform brightness along the length of the light guide 22 when the light guide 22 is used with a single light source 44. The light guide 22 has a first end 46 positioned opposite from a second end 48. The first end 46 is positioned closest to the light source 44. The dot concentration 36 gradually increases along a gradient extending along the length L from the first end 46 to the second end 48.

As shown in FIG. 4, uniform light brightness is provided by increasing the dot concentration along the length L in proportion to the decrease in light intensity within the light guide 22. The dots at a particular point along the length are generally uniformly distributed about the circumference C of the light guide 22. This configuration provides generally uniform 360-degree lighting/extraction along the entire length L of the light guide 22.

Figure 5:
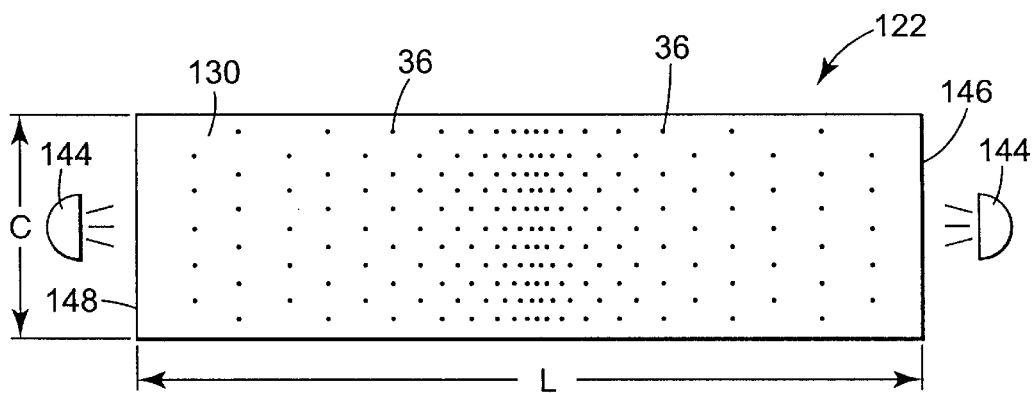
FIG. 5 is a plan view showing another light guide having a light extraction pattern in accordance with the principles of the present invention, the depicted light guide has been longitudinally cut and laid flat.

FIG. 5 shows another light guide 122 constructed in accordance with the principles of the present invention. The light guide 122 has been longitudinally cut and laid flat such that a length L and a circumference C of the light guide 122 are shown. The length L extends between first and second ends 146 and 148 of the light guide 122. A pattern of light extracting dots 36 is provided on a smooth inner surface 130 of the light guide 122. The pattern of dots 36 has a concentration gradient that extends along the length L of the light guide 122. The gradient is adapted for providing a uniform brightness along the length L of the light guide 122 when light sources 144 are positioned at each of the ends 146 and 148. To provide uniform brightness, the dot concentration gradually or progressively increases as the light guide 122 extends from the ends 146, 148 toward the middle of the length L. Thus, the largest concentration of dots 36 is located at the middle of the light guide 122. This particular configuration may also be used to provide uniform lighting from a light guide having a reflective end cap positioned opposite from the light source.

Figure 6:
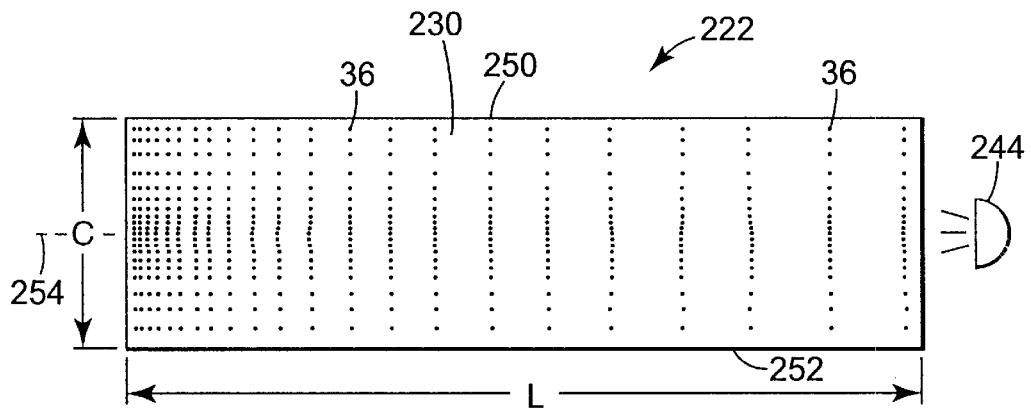
FIG. 6 is a plan view showing still another light guide having a light extraction pattern in accordance with the principles of the present invention, the depicted light guide has been longitudinally cut and laid flat.

FIG. 6 illustrates another light guide 222 constructed in accordance with the principles of the present invention. Similar to previous embodiments, the light guide 222 has been longitudinally cut and laid flat with a smooth inner surface 230 facing upward. The light guide 222 includes a circumference C and a length L. Similar to the embodiment of FIG. 4, the light guide 222 is adapted to emit light of a substantially uniform brightness along its length L when used with a single light source 244. To achieve this uniformity, a pattern of dots 36 is provided on the smooth inner surface 230. The pattern of dots 36 has a concentration gradient that increases as the light guide 222 extends lengthwise away from the light source 244. The pattern of dots 36 also has a second concentration gradient that varies in a circumferential direction along the light guide 222. For example, the dots 36 are arranged such that the dot concentration progressively increases as the light guide 222 extends from longitudinal edges 250, 252 toward a longitudinal midline 254 of the light guide 222. Essentially, the circumferential dot gradient is superimposed over the lengthwise dot gradient. The lengthwise dot gradient provides uniform brightness along the length of the light guide 222. The circumferential dot gradient causes a greater amount of light to be released from one side of the light guide 222 thereby creating a directional lighting effect. Such directional lighting is useful if the light guide 222 is mounted against a structure such as a ceiling or a wall. For such applications, a majority of the light can be directed away from the ceiling or the wall to maximize the amount of functional lighting generated by the light guide 222. For this application, it may be desirable for the dots at the highest dot concentration to be primarily reflective and less translucent to ensure that a majority of the extracted light is reflected toward one side of the light guide 222.

Figure 7:
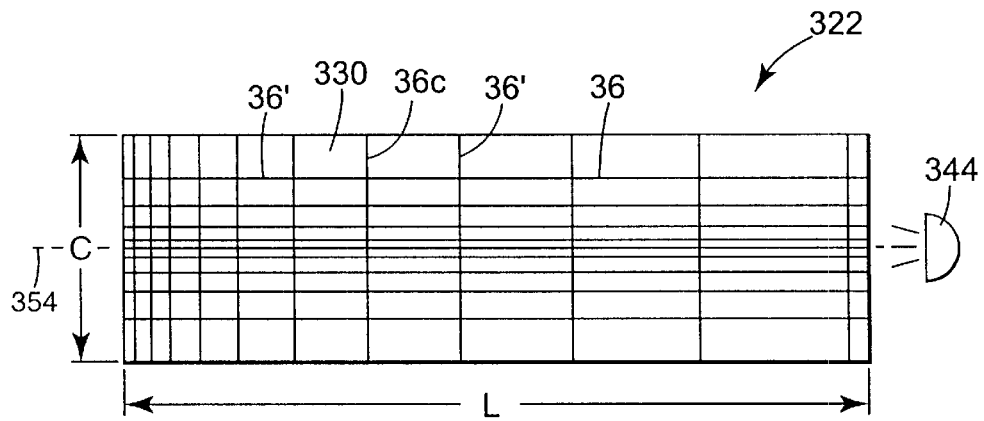
FIG. 7 is a plan view showing a further light guide having a light extraction pattern in accordance with the principles of the present invention, the depicted light guide has been longitudinally cut and laid flat.

FIG. 7 illustrates another light guide 322 constructed in accordance with the principles of the present invention. The light guide 322 has been longitudinally cut and laid flat with a smooth inner surface 330 facing upward. The light guide 322 defines a length L and a circumference C. A plurality of release structures in the form of lines 36' have been provided on the inner surface 330. Similar to the embodiment of FIG. 6, the lines 36' are arranged to provide a bidirectional gradient adapted to provide light of uniform brightness along the length L of the light guide 322, and also to provide greater light output from one side of the light guide 322. The lines 36' include circumferential lines $36_c$ that are spaced progressively closer together as the light guide 322 extends away from a light source 344. The lines 36' also include longitudinal lines $36_l$ that are spaced progressively closer together as the light guide 322 extends toward a longitudinal midline 354 of the light guide 322. The line pattern provides a similar lighting effect as the dot pattern of the embodiment of FIG. 6. It will be appreciated that the lines 36' can be applied to the light guide 322 by any one of the various techniques previously described with respect to the dots 36.

Figure 8:
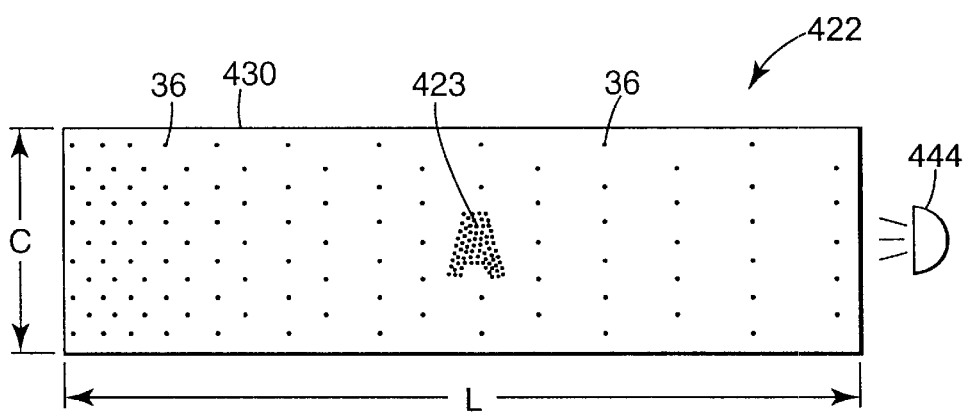
FIG. 8 is a plan view showing an additional light guide having a light extraction pattern in accordance with the principles of the present invention, the depicted light guide has been longitudinally cut and laid flat.

FIG. 8 illustrates another light guide 422 constructed in accordance with the principles of the present invention. The light guide 422 has been longitudinally cut and laid flat with a smooth inner surface 430 facing upward. The light guide 422 defines a length L and a circumference C. The light guide 422 includes a pattern of dots 36 arranged in a concentration gradient that progressively increases as the light guide 422 extends lengthwise away from a light source 444. Similar to previous embodiments, the concentration gradient assists in providing the light guide 422 with substantially uniform brightness along its length L. The dot pattern also includes a region 423 having a higher dot concentration than surrounding regions. The region 423 defines an image (e.g., the letter "A") that is superimposed over the dot gradient extending along the length L of the light guide 422. The region 423 causes more light to be extracted at the region 423 than at the surrounding areas thereby causing the image to be visible through the light guide 422. It will be appreciated that any number of different types of images can be portrayed such as letters, numbers, symbols, graphic displays, art work, designs, etc.

With respect to the embodiment of FIG. 8, it may be desirable to have an outer protective sleeve including an image (e.g., a digital image printed on the sleeve or printed on a liner positioned between the sleeve and the light guide 422) that corresponds to the region 423 of higher dot concentration. For example, the image can include a more transparent region (i.e., a region that is clearer or absorbs less light than a surrounding region) that aligns with the region 423. Alignment between the transparent region and the region 423 can be provided by positioning the transparent region directly over the region 423 such that light refracted by the region 423 is directed through the more transparent region. Alternatively, the transparent region can be positioned directly opposite from the region 423 such that light is reflected by the region 423 across the light guide and through the transparent region. The more transparent region can have the same shape as the region 423, or the two shapes can be different.

While not shown, it will be appreciated that the light guides 122, 222, 322 and 422 include structured outer sides positioned opposite from the depicted inner sides 130, 230, 330 and 430. The structured outer sides are preferably similar to the outer side 28 of the light guide 22.

Figure 9:
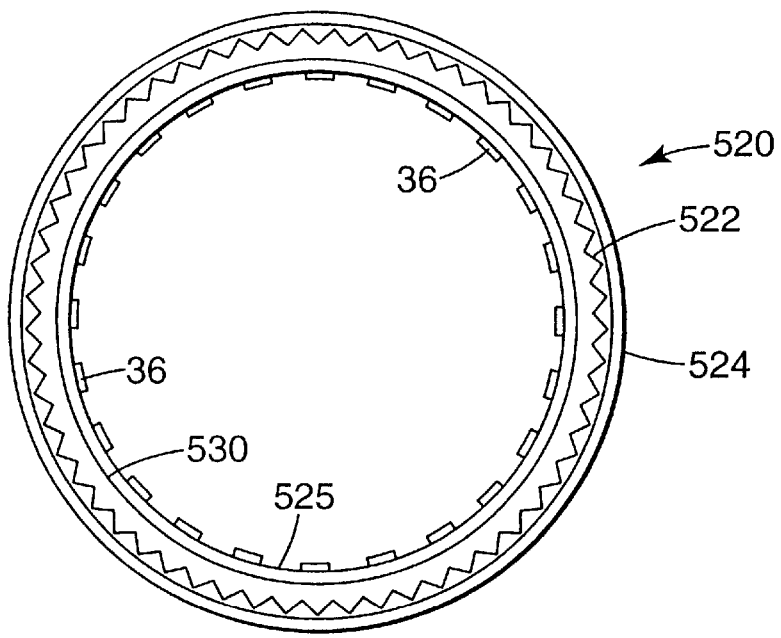
FIG. 9 is an end view of a another illumination device constructed in accordance with the principles of the present invention, the illumination device has a pattern of light release structures provided on a liner inserted within a light guide.

FIG. 9 shows another illumination device 520 constructed in accordance with the principles of the present invention. The illumination device 520 includes a light guide 522 surrounded by a protective sleeve 524. A transparent inner cylinder/liner 525 is positioned within the light guide 522. A pattern of dots 36 is provided on an interior or exterior surface of the liner 525. It will be appreciated that the pattern of dots can have any of the previously described dot patterns as well as other types of dot patterns. In certain embodiments, the inner liner 525 can be removable from the interior of the light guide 522 thereby allowing different extraction liners to be inserted into the light guide 522 to achieve different lighting effects. The extraction liner 525 is also particularly useful in combination with seamless or extruded light guides 522 where it is difficult to apply dot patterns to a smooth inner surface 530 of the light guide 522.

Figure 10:
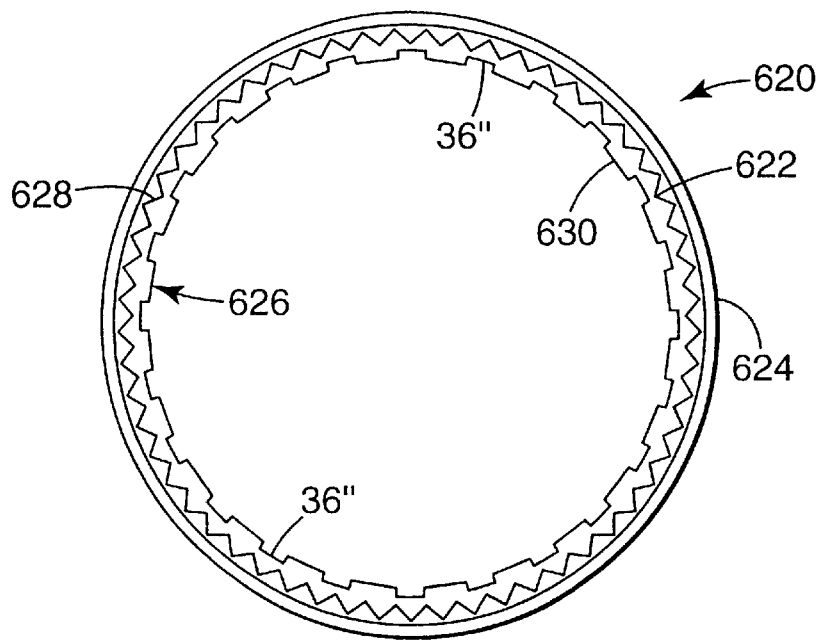
FIG. 10 is an end view of a further illumination device constructed in accordance with the principles of the present invention, the illumination device includes a light guide having a pattern of discrete ablations for releasing light from the light guide.

FIG. 10 illustrates another illumination device 620 constructed in accordance with the principles of the present invention. The illumination device 620 includes a light guide 622 surrounded by a protective sleeve 624. The light guide 622 includes a cylindrical wall 626 having a structured outer surface 628 and an inner surface 630. A plurality of light releasing dots 36" is formed on the inner surface 630. The dots 36" are in the form of a plurality of ablated recesses or holes defined in the inner surface 630. The ablated dots 36" are adapted for altering the pathway of light within the device 620 such that the light is extracted from the device 620. It will be appreciated that the ablated dots 36" can be arranged in any of the previously described dot patterns, as well as other dot patterns.

Figure 11:
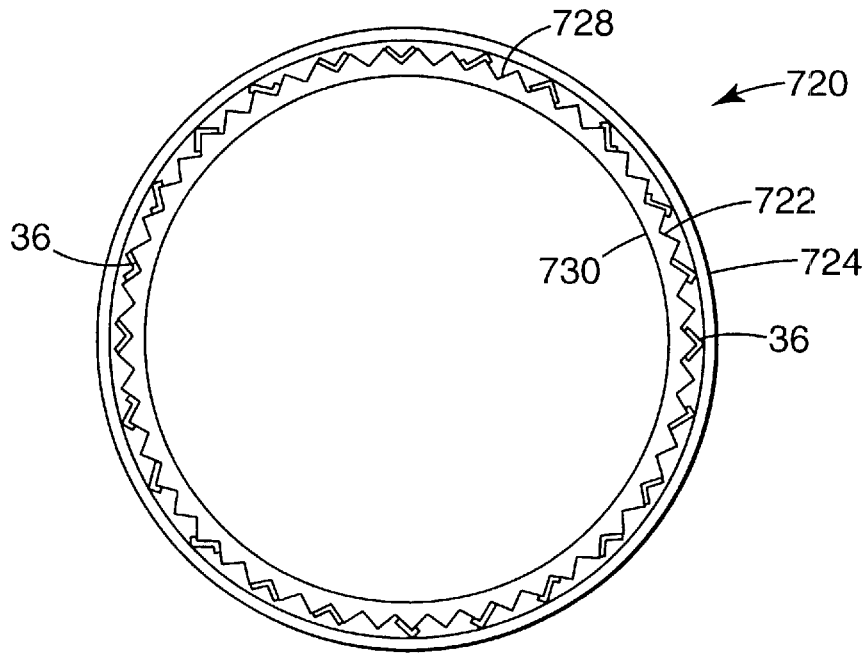
FIG. 11 is an end view of another illumination device constructed in accordance with the principles of the present invention, the illumination device includes a light guide having a pattern of dots provided on its outer surface for releasing light from the light guide.

FIG. 11 shows another illumination device 720 constructed in accordance with the principles of the present invention. The illumination device 720 includes a light guide 722 surrounded by a protective sleeve 724. The light guide 722 is formed by a cylindrical wall 726 having a structured outer surface 728 and a smooth inner surface 730. The light guide 722 also includes a plurality of light release structures for causing light to be released through the cylindrical wall 726. Preferably, the light release structures comprise a pattern or array of dots 36 provided on the structured outer surface 728 of the cylindrical wall 726. It will be appreciated that the dots 36 can be applied to the outer surface 728 in a manner similar to the techniques described for applying dots to the inner surface 30 of the light guide 22. Further, it will be appreciated that any of the patterns shown in FIGS. 4–8, as well as other patterns, can be applied to the structured outer surface 728 to provide a desired lighting effect. The dots 36 provided on the structured outer surface 728 reduce the internal reflectance of the light guide 722 in the dotted areas and essentially create a window for light to escape from the light guide 722 by refraction.

As shown in FIGS. 4–8, the light release structures are arranged in generally linear arrays. Whether the light release structures are on the smooth planer side or the prismatic side, it will be appreciated that in alternative embodiments, the light release structures 36 can be more randomly arranged. Also, the light release structures can be arranged so as to not provide 360 degree light extraction, or so as to not provide light extraction along the entire length of the light guides. Also, to provide directional lighting, a pattern of light release structures can be provided on a partial arc of the light guide (e.g., on a 180 degree arc). In such embodiments, a "window" free of light release structures can be provided opposite the patterned partial arc. Light reflected by the light release structures is directed through the window. A back reflector provided behind the patterned partial arc (e.g., on the protective sleeve) can be used to further direct light through the window.

Referring back to FIG. 1, the outer sleeve 24 of the light conduit 20 is preferably made of a relatively thin, flexible material. In one non-limiting embodiment, the sleeve 24 is made of a sheet of polycarbonate material having a thickness of about 0.020 inches. In other embodiments, the thickness can be in a range of 0.008–0.04 inches. The sleeve 24 is preferably rolled to form a generally tubular shape with longitudinal edges of the sleeve 24 being connected at a longitudinal seam. It will be appreciated that adhesive, adhesive tape, ultra sonic welding or laser welding can be used to secure the seam. In certain embodiments, the longitudinal edges of the sleeve 24 can overlap one another. In still other embodiments, the sleeve 24 can be extruded or otherwise formed as a seamless, unitary tube.

Figure 12:
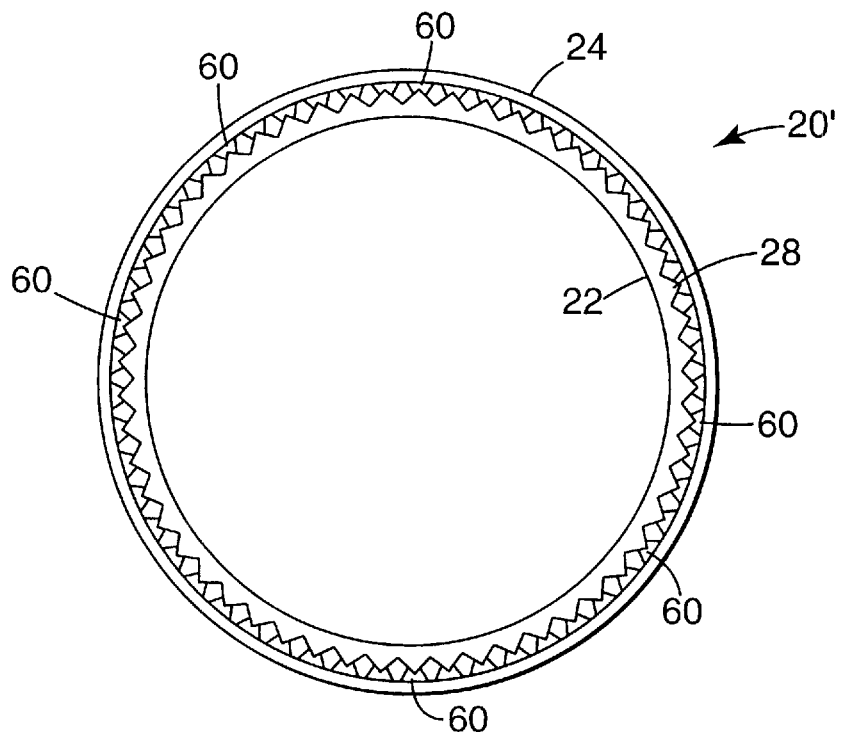
FIG. 12 is an end view of an another illumination device constructed in accordance with the principles of the present invention, the illumination device includes an outer sleeve bonded to an inner light guide.

In some embodiments, the sleeve 24 can be frictionally retained about the light guide 22. Alternatively, FIG. 12 shows an illumination device 20' in which the sleeve 24 is connected to the light guide 22 by adhesive 60. In this embodiment, the adhesive 60 forms bonds between the sleeve 24 and the light guide 22 at three or more discrete locations spaced about the outer circumference of the light guide 22. As shown in this embodiment, a majority of the prism tips are bonded to the outer sleeve 24 (e.g., FIG. 12 shows all of the tips bonded to the sleeve). Alternatively, a continuous coating of adhesive can be applied circumferentially to all or part of the prismatic film even filling the grooves as long as there is an index of refraction difference between the adhesive and the optical lighting film/prismatic film such that total internal reflection and light transport are achieved. In certain embodiments, the adhesive can be used to provide light extraction from the light guide 22. In other embodiments, dots or other light release structures, such as those previously described, can be used to provide light extraction.

Figure 13:
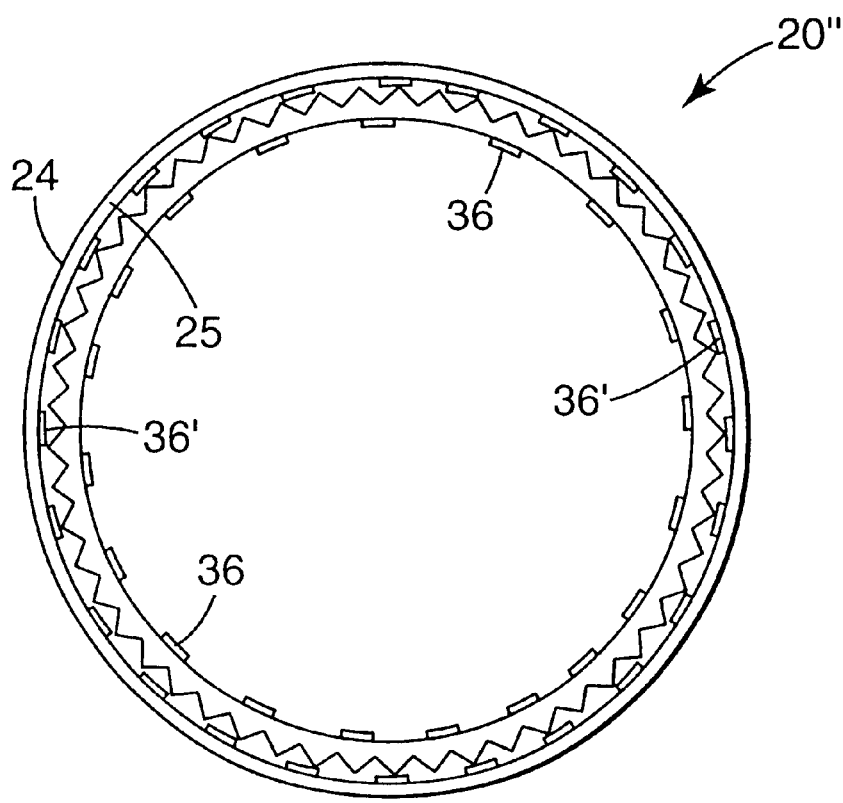
FIG. 13 is an end view of a further illumination device constructed in accordance with the principles of the present invention, the illumination device includes a light guide surrounded by an outer sleeve having a pattern of reflective dots.

It will be appreciated that the sleeve 24 can be transparent. Of course, other finishes (e.g., matte, colored or opaque finishes) can also be used. Additionally, the inner or outer surfaces of the sleeve 24 can include structure for providing the light conduit with a desired lighting effect. For example, portions (e.g., partial arcs) of the protective sleeve 24 can be coated or otherwise provided with a reflective material such as a diffuse reflective material (e.g., a white paint) or a specular reflective material (e.g., a mirrored surface). In certain embodiments, a reflective material (e.g., Tyvek™ made by DuPont, of Wilmington, Del.) can be positioned between the protective sleeve 24 and the light guide 22. FIG. 13 shows an illumination device 20" having a pattern of reflective or translucent dots 36' provided on an inner surface 25 of the sleeve 24. Preferably, a plurality of dots 36 is also provided on the light guide 22 for directing light through the light guide wall toward the dots 36' on the sleeve 24. The dots 36' can be arranged in a variety of patterns to provide a desired appearance to the device 20". For example, the dots 36' on the sleeve can be arranged on a gradient that extends along the length of the device 20" to provide non-uniform lighting. Also, the dots 36' can be provided on a partial arc of the sleeve, or arranged in a circumferential gradient, to function as back reflectors for directional lighting. Additionally, in still other embodiments, the majority of the surface 25 of the sleeve 24 may be reflective with openings or "holes" patterned in the reflective material. A similar effect can be provided by placing a reflective liner having a plurality of openings between the light guide 22 and the outer sleeve 24.

The sleeve 24 is significant because the structured side 28 of the light guide 22 can be easily damaged and is also sensitive to dirt and moisture. Thus, the sleeve 24 functions to protect the fragile outer surface 28. The sleeve 24 also assists in enhancing the handleability of the illumination device 20.

An important aspect of the light conduit 22 is that the illumination device 20 may be flexible or elastically deformable. A preferred use of the device 20 is in combination with generally rigid fixtures capable of holding the illumination device 20 in elastically deformed, non-cylindrical configurations. FIGS. 14A–14D illustrate four different fixtures 62A–62D each made of a generally rigid polymeric material. The term "rigid" is intended to mean that the fixtures have sufficient strength to retain the illumination device 20 in an elastically deformed, non-cylindrical shape.

The fixtures 62A–62D can be transparent or opaque, and can include a variety of different types of finishes such as matte finishes, colored finishes or a variety of ornamental designs. As shown in FIGS. 14A–14D, each of the fixtures 62A–62D may extruded as a single piece. The illumination device 20 (shown schematically) can be inserted into any one of the fixtures 62A–62D. For example, the illumination device 20 is preferably deformed and slid longitudinally into or through the fixtures 62A–62D. During the insertion process, the protective sleeve 24 prevents the structured outer surface 28 of the light guide 22 from becoming damaged. With the illumination device 20 inserted within the fixture 62A, the fixture 62A retains the device 20 in an elastically deformed, generally square cross-sectional configuration. With the illumination device 20 inserted within the fixture 62B, the device 20 is retained by the fixture 62B in an elastically deformed, generally triangular cross-sectional configuration. With the illumination device 20 inserted within the fixture 62C, the device 20 is retained by the fixture 62C in an elastically deformed, generally rectangular cross-sectional configuration. With the illumination device 20 inserted within the fixture 62D, the device 20 is retained by the fixture 62D in an elastically deformed, generally domed cross-sectional configuration.

Figure 14A:
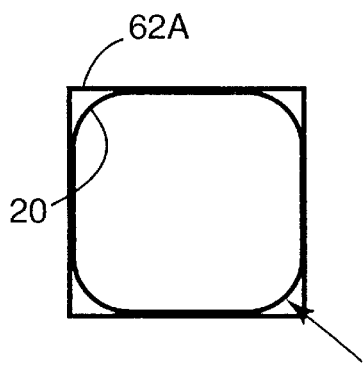
FIG. 14A shows an illumination device in accordance with the principles of the present invention mounted within a square fixture.
Figure 14B:
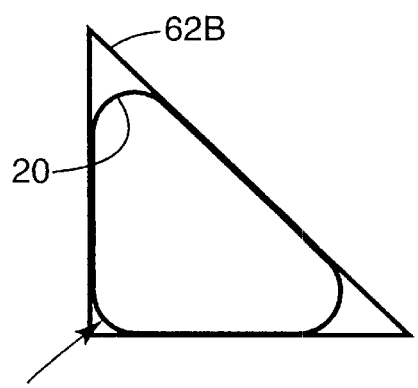
FIG. 14B shows an illumination device in accordance with the principles of the present invention mounted within a triangular fixture.
Figure 14C:
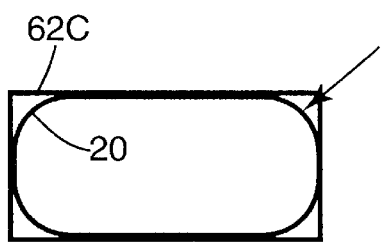
FIG. 14C shows an illumination device in accordance with the principles of the present invention mounted within a rectangular fixture.
Figure 14D:
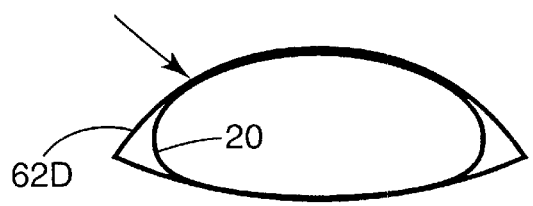
FIG. 14D shows an illumination device in accordance with the principles of the present invention mounted within a dome-shaped fixture.
Figure 14E:
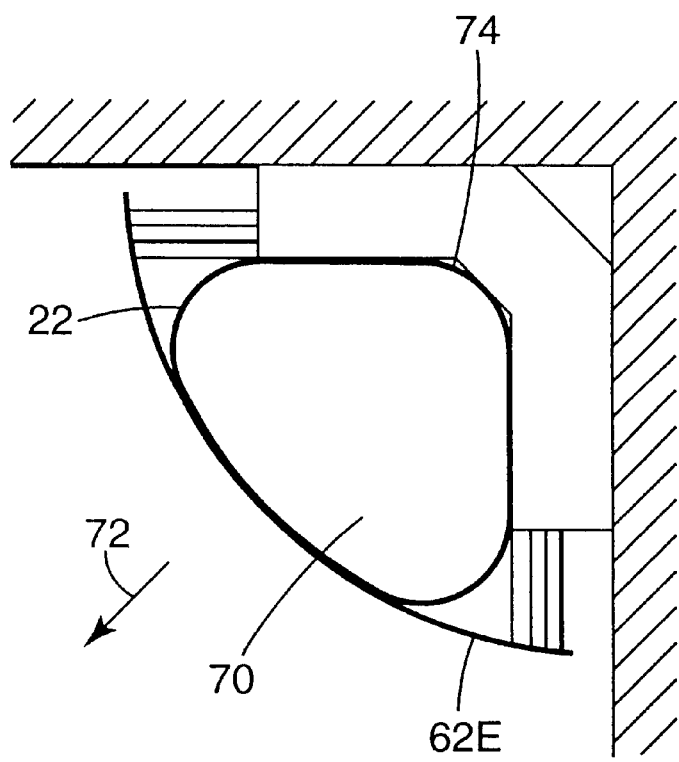
FIG. 14E shows an illumination device in accordance with the principles of the present invention mounted within a corner mount fixture.

FIG. 14E illustrates a fixture 62E adapted for mounting the light guide 22 in a corner. The fixture 62E is adapted to retain the illumination device 20 in a generally triangular configuration. Preferably, light bulbs 70 are provided at least at one end of the illumination device 20. To direct light away from the corner, the illumination device 20 preferably has a bidirection dot gradient configured for directing light away from the corner in a direction indicated generally by arrow 72. Such a bidirectional gradient is shown in FIG. 6. Preferably, a highest concentration of dots is located adjacent to region 74 of the illumination device 20.

Figure 15A:
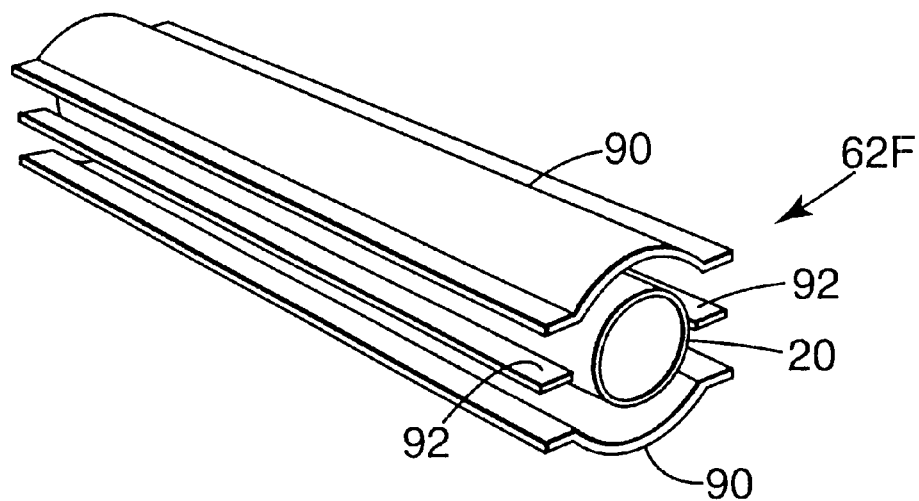
FIG. 15A shows an illumination device in accordance with the principles of the present invention mounted within a two-piece fixture.
Figure 15B:
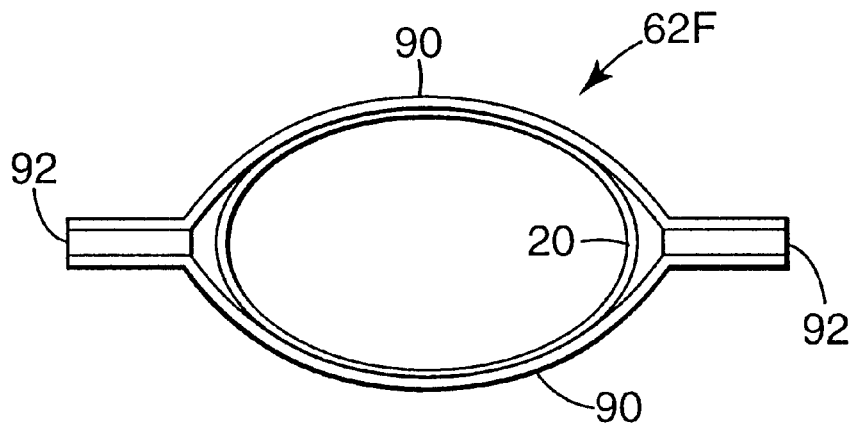
FIG. 15B is an end view of the illumination device of FIG. 15A.

FIG. 15A shows a fixture 62F having two separate opposing pieces 90 for holding the illumination device 20. Similar to the previous fixtures, the pieces 90 are preferably light transmissive (e.g., transparent, opaque, etc.). With the illumination device 20 inserted within the fixture 62F, the two opposing pieces 90 of the fixture are clamped or otherwise fastened together to deform the illumination device 20 into a generally elliptical cross-sectional shape (FIG. 15B). The fixture 62F preferably has a general clam shell design with decorative colored spacers 92 positioned between the pieces 90. However, it will be appreciated that other shapes (e.g., squares, rectangles, triangles, diamonds, octagons, hexagons, etc.) could also be used. Additionally, for certain embodiments, fixtures having more than two pieces can be used.

FIG. 16 shows two lighting modules 20a and 20b constructed in accordance with the principles of the present invention. The modules 20a and 20b include alignment features for allowing the modules to be interconnected to form light conduits having extended lengths. The alignment features are preferably configured to ensure that dot patterns or gradients provided on each of the modules align or are consistent with one another to provide a desired lighting appearance along the length of the extended light conduit. As shown in FIG. 16, the alignment features include notches 27 and tabs 29 located at the axial ends of the modules 20a and 20b. It will be appreciated that when the modules 20a and 20b are interconnected, the notch 27 of the module 20a receives the tab 29 formed on the interconnected module 20b such that angular/rotational alignment is achieved between the modules 20a and 20b. It will be appreciated that each of the modules 20a and 20b can have a similar construction as the illumination device 20 or any other of the illumination devices disclosed herein.

It will be appreciated that the alignment features can be included on the light guide 22, the protective sleeve 24, a separate extractor (e.g., liner 525) or any combination thereof. Also, it will be appreciated that when long light guide lengths are is needed, the individual light guides can have blended extraction gradients (i.e., the gradients are selected so that where two pipes interconnect, the dot concentrations are about the same) that provide uniform lighting along the entire length. The alignment features can also be used to provide rotational alignment of a illumination device within a fixture. For example, the illumination device can include end notches that receive alignment projections provided on the fixture.

In certain embodiments, a flat sheet of optical lighting film in accordance with the principles of the present invention can be used for lighting purposes. Light extracting patterns can be printed on or otherwise applied to the sheet. A protective layer can be bonded to the prisms of the lighting film for protecting the prisms. Adhesive can also be provided on the outer side of the protective layer (i.e., the side that faces away from the prisms.) This allows the sheet to be affixed to a fixture such as a glass wall or other type of fixture.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. An illumination device comprising:
    a hollow light guide including an optical film having a generally smooth inner side and a structured outer side, the structured outer side including a plurality of prisms defining grooves that extend along a length of the light guide; and
    a plurality of discrete dots provided adjacent at least one of the inner and outer sides of the light guide for causing light to be released from the light guide through the optical film of the light guide, the dots each having a thickness generally in the range of 10–15 microns.

2. The illumination device of claim 1, wherein the dots are provided at the inner side of the light guide.

3. The illumination device of claim 2, wherein the dots are made of a material selected from the group consisting of inks, paints and dyes.

4. An illumination device comprising:
    a hollow light guide including an optical film having a generally smooth inner side and a structured outer side, the structured outer side including a plurality of prisms defining grooves that extend along a length of the light guide; and
    a plurality of discrete dots provided adjacent at least one of the inner and outer sides of the light guide for causing light to be released from the light guide through the optical film of the light guide;
    wherein the dots are provided at the inner side of the light guide; and
    wherein the dots comprise ablations formed on the inner side of the light guide.

5. An illumination device comprising:
    a hollow light guide including an optical film having a generally smooth inner side and a structured outer side, the structured outer side including a plurality of prisms defining grooves that extend along a length of the light guide;
    a plurality of discrete dots provided adjacent at least one of the inner and outer sides of the light guide for causing light to be released from the light guide through the optical film of the light guide;
    wherein the dots are provided at the inner side of the light guide; and
    wherein the dots define a first dot concentration gradient that extends along the length of the light guide.

6. The illumination device of claim 5, wherein the dots include a region of increased dot concentration that defines an image superimposed over the first dot concentration gradient.

7. The illumination device of claim 5, wherein the dots define a second dot concentration gradient that extends along a circumference of the light guide.

8. The illumination device of claim 2, wherein the dots define a dot concentration gradient that extends along a circumference of the light guide.

9. The illumination device of claim 2, wherein the dots are translucent.

10. The illumination device of claim 2, wherein the dots are made of titanium dioxide.

11. The illumination device of claim 2, wherein the dots provide substantially 360 degree extraction of light from the light guide.

12. The illumination device of claim 2, wherein the dots are arranged and configured to extract light from the illumination device without forming any appreciable discontinuities in lighting.

13. The illumination device of claim 2, wherein the dots are provided on a cylindrical liner positioned within the light guide.

14. The illumination device of claim 2, wherein the dots are provided directly on the inner side of the light guide.

15. The illumination device of claim 1, wherein the wall is cylindrical.

16. The illumination device of claim 1, wherein the dots are provided on the outer side of the light guide.

17. The illumination device of claim 16, wherein the dots are made of a material selected from the group consisting of inks, paints and dyes.

18. The illumination device of claim 16, wherein the dots define a first dot concentration gradient that extends along the length of the light guide.

19. The illumination device of claim 18, wherein the dots include a region of increased dot concentration that defines an image superimposed over the first dot concentration gradient.

20. The illumination device of claim 18, wherein the dots define a second dot concentration gradient that extends along a circumference of the light guide.

21. The illumination device of claim 16, wherein the dots define a dot concentration gradient that extends along a circumference of the light guide.

22. The illumination device of claim 16, wherein the dots are translucent.

23. The illumination device of claim 16, wherein the dots are made of titanium dioxide.

24. The illumination device of claim 16, wherein the dots provide substantially 360 degree extraction of light from the light guide.

25. The illumination device of claim 16, wherein the dots are arranged and configured to extract light from the illumination device without forming any appreciable discontinuities in lighting.

26. An illumination device comprising:
a hollow light guide including a wall having a generally smooth inner side and a structured outer side, the structured outer side including a plurality of prisms defining grooves that extend along a length of the light guide; and
a printed pattern of discrete light release structures provided adjacent at least one of the inner and outer sides of the light guide for causing light to be released from the light guide through the wall of the light guide, the light release structures each having a thickness generally in the range of 10–15 microns.

27. The illumination device of claim 26, wherein the light release structures include a plurality of lines.

28. The illumination device of claim 27, wherein the lines include a plurality of circumferential lines.

29. An illumination device comprising:
a hollow light guide including a wall having a generally smooth inner side and a structured outer side, the structured outer side including a plurality of prisms defining grooves that extend along a length of the light guide;
a printed pattern of light release structures provided adjacent at least one of the inner and outer sides of the light guide for causing light to be released from the light guide through the wall of the light guide;
wherein the light release structures include a plurality of lines;
wherein the lines include a plurality of circumferential lines; and
wherein the lines include a plurality of longitudinal lines that intersect the circumferential lines.

30. The illumination device of claim 28, wherein a spacing between the circumferential lines varies along the length of the light guide.

31. The illumination device of claim 29, wherein a spacing between the longitudinal lines varies along a circumference of the light guide.

32. The illumination device of claim 26, wherein the light release structures comprise a plurality of dots.

33. An illumination device comprising:
a hollow light guide including a wall structure having a generally smooth inner side and a structured outer side, the structured outer side including a plurality of prisms defining grooves that extend along a length of the light guide; and
a plurality of light release structures provided adjacent at least one of the inner and outer sides of the light guide for causing light to be released from the light guide through the wall structure of the light guide, the release structures being arranged and configured to provide substantially 360 degree extraction from the light guide.

34. The illumination device of claim 33, wherein the light release structures comprise dots.

35. The illumination device of claim 33, wherein the light release structures comprise lines.

36. An illumination device comprising:
a hollow light guide including an optical film having a generally smooth inner side and a structured outer side, the structured outer side including a plurality of prisms defining grooves that extend along a length of the light guide;
a plurality of discrete dots provided adjacent at least one of the inner and outer sides of the light guide for causing light to be released from the light guide through the wall of the light guide;
the dots are provided at the inner side of the light guide;
the dots define a first dot concentration gradient that extends along the length of the light guide; and
the dots include a region of increased dot concentration that defines an image superimposed over the first dot concentration gradient.

37. An illumination device comprising:
a hollow light guide including an optical film having a generally smooth inner side and a structured outer side, the structured outer side including a plurality of prisms defining grooves that extend along a length of the light guide;
a plurality of discrete dots provided adjacent at least one of the inner and outer sides of the light guide for causing light to be released from the light guide through the wall of the light guide;
the dots are provided at the inner side of the light guide;
the dots define a first dot concentration gradient that extends along the length of the light guide; and
the dots define a second dot concentration gradient that extends along a circumference of the light guide.

38. An illumination device comprising:
a hollow light guide including an optical film having a generally smooth inner side and a structured outer side, the structured outer side including a plurality of prisms defining grooves that extend along a length of the light guide;
a plurality of discrete dots provided adjacent at least one of the inner and outer sides of the light guide for causing light to be released from the light guide through the wall of the light guide;
the dots are provided at the inner side of the light guide; and
the dots define a dot concentration gradient that extends along a circumference of the light guide.

39. An illumination device comprising:
a hollow light guide including an optical film having a generally smooth inner side and a structured outer side, the structured outer side including a plurality of prisms defining grooves that extend along a length of the light guide;
a plurality of discrete dots provided adjacent at least one of the inner and outer sides of the light guide for causing light to be released from the light guide through the wall of the light guide;
the dots are provided at the inner side of the light guide; and
the dots are made of titanium dioxide.

40. An illumination device comprising:
a hollow light guide including an optical film having a generally smooth inner side and a structured outer side, the structured outer side including a plurality of prisms defining grooves that extend along a length of the light guide;

a plurality of discrete dots provided adjacent at least one of the inner and outer sides of the light guide for causing light to be released from the light guide through the wall of the light guide;

the dots are provided at the inner side of the light guide; and the dots provide substantially 360 degree extraction of light from the light guide.

41. An illumination device comprising:

a hollow light guide including an optical film having a generally smooth inner side and a structured outer side, the structured outer side including a plurality of prisms defining grooves that extend along a length of the light guide;

a plurality of discrete dots provided adjacent at least one of the inner and outer sides of the light guide for causing light to be released from the light guide through the wall of the light guide;

the dots are provided at the inner side of the light guide; and the dots are arranged and configured to extract light from the illumination device without forming any appreciable discontinuities in lighting.

42. An illumination device comprising:

a hollow light guide including an optical film having a generally smooth inner side and a structured outer side, the structured outer side including a plurality of prisms defining grooves that extend along a length of the light guide;

a plurality of discrete dots provided adjacent at least one of the inner and outer sides of the light guide for causing light to be released from the light guide through the wall of the light guide;

the dots are provided at the inner side of the light guide; and the dots are provided on a cylindrical liner positioned within the light guide.

43. An illumination device comprising:

a hollow light guide including an optical film having a generally smooth inner side and a structured outer side, the structured outer side including a plurality of prisms defining grooves that extend along a length of the light guide;

a plurality of discrete dots provided adjacent at least one of the inner and outer sides of the light guide for causing light to be released from the light guide through the wall of the light guide; and the dots are provided on the outer side of the light guide.

44. The illumination device of claim 43, wherein the dots are made of a material selected from the group consisting of inks, paints and dyes.

45. The illumination device of claim 43, wherein the dots define a first dot concentration gradient that extends along the length of the light guide.

46. The illumination device of claim 45, wherein the dots include a region of increased dot concentration that defines an image superimposed over the first dot concentration gradient.

47. The illumination device of claim 45, wherein the dots define a second dot concentration gradient that extends along a circumference of the light guide.

48. The illumination device of claim 43, wherein the dots define a dot concentration gradient that extends along a circumference of the light guide.

49. The illumination device of claim 43, wherein the dots are translucent.

50. The illumination device of claim 43, wherein the dots are made of titanium dioxide.

51. The illumination device of claim 43, wherein the dots provide substantially 360 degree extraction of light from the light guide.

52. The illumination device of claim 43, wherein the dots are arranged and configured to extract light from the illumination device without forming any appreciable discontinuities in lighting.

* * * * *